(12) United States Patent
Sha (10) Patent No.: US 10,759,290 B2
(45) Date of Patent: Sep. 1, 2020

(54) FUEL CHARGING OR ELECTRICITY CHARGING PORT LID LOCK AND FUEL CHARGING OR ELECTRICITY CHARGING PORT LID ASSEMBLY

(71) Applicant: Illinois Tool Works Inc., Glenview, IL (US)

(72) Inventor: Wenquan Sha, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 129 days.

(21) Appl. No.: 16/057,936

(22) Filed: Aug. 8, 2018

(65) Prior Publication Data

US 2019/0047428 A1   Feb. 14, 2019

(30) Foreign Application Priority Data

Aug. 11, 2017  (CN) .......................... 2017 1 0687660
Aug. 11, 2017  (CN) ....................... 2017 2 1008111 U (51) Int. Cl.
  *B62D 25/00*    (2006.01)
  *B60L 53/16*    (2019.01)
  (Continued)

(52) U.S. Cl.
  CPC .............. *B60L 53/16* (2019.02); *B60K 15/05* (2013.01); *E05B 83/34* (2013.01); *E05C 19/16* (2013.01);
  (Continued)

(58) Field of Classification Search
  CPC . B60L 53/16; B60K 15/05; B60K 2015/0576; B60K 2015/0538;
  (Continued)

(56) References Cited

U.S. PATENT DOCUMENTS

| 2015/0008685 A1* | 1/2015 | Beck ...................... | B60K 15/05 292/336.3 |
| 2016/0375762 A1* | 12/2016 | Lee ........................ | B60K 15/05 296/97.22 |

(Continued)

FOREIGN PATENT DOCUMENTS

| DE | 102011090205 A1 | 7/2013 |
| DE | 102015005303 A1 | 10/2016 |

(Continued)

OTHER PUBLICATIONS

European Search Report for European Patent Application No. 18187017.1, dated Jan. 25, 2019.

*Primary Examiner* — Jerry E Redman
(74) *Attorney, Agent, or Firm* — Quarles & Brady LLP (57) ABSTRACT

Fuel charging or electricity charging port lid lock includes an elevating shaft provided with an elevating thread on an exterior wall thereof. The port lid lock also includes a worm gear configured to drive the elevating shaft. The worm gear is sleeved outside of the elevating shaft. The port lid lock also includes a worm configured to drive the worm gear. The elevating shaft is configured to be capable of moving up and moving down along an axial direction of the elevating shaft and rotating about the axial direction of the elevating shaft when driven by the worm. A head portion of the elevating shaft is used to drive a fuel charging or electricity charging port lid so as to control the opening and closing of the fuel charging or electricity charging port lid.

20 Claims, 11 Drawing Sheets (51) Int. Cl.
  *E05B 83/34* (2014.01)
  *E05F 15/603* (2015.01)
  *E05C 19/16* (2006.01)
  *E05D 15/58* (2006.01)
  *B60K 15/05* (2006.01)

(52) U.S. Cl.
  CPC .......... *E05D 15/581* (2013.01); *E05F 15/603* (2015.01); *B60K 2015/0515* (2013.01); *B60K 2015/0538* (2013.01); *B60K 2015/0576* (2013.01); *B60Y 2400/702* (2013.01); *E05Y 2900/534* (2013.01)

(58) Field of Classification Search
  CPC ............. B60K 2015/0515; E05B 83/34; E05F 15/603; E05D 15/581; B66Y 2400/702; E05Y 2900/534
  USPC ...................................................... 296/97.22
  See application file for complete search history.

(56) References Cited

U.S. PATENT DOCUMENTS

2019/0093399 A1* 3/2019 Sakurai ................. B60K 15/05
2019/0284860 A1* 9/2019 Wang .................... E05F 15/662

FOREIGN PATENT DOCUMENTS

FR      3001488 A1   8/2014
KR   101245173 B1   3/2013

* cited by examiner

FUEL CHARGING OR ELECTRICITY CHARGING PORT LID LOCK AND FUEL CHARGING OR ELECTRICITY CHARGING PORT LID ASSEMBLY

RELATED APPLICATION

The present application claims the benefit of China Application Nos. 201710687660.5 and 201721008111.2, each of which was filed on Aug. 11, 2017 and is incorporated herein by reference in its entirety.

TECHNICAL FIELD

The present disclosure generally relates to a lid lock, and more particularly to a lid lock for a fuel charging or electricity charging port of a vehicle.

BACKGROUND

A fuel vehicle has a fuel charging port for supplying fuel or oil, and an electric vehicle has a corresponding electricity charging port for charging. The current fuel charging port or electricity charging port is shielded by a lid, and the lid is locked to the fuel charging port or the electricity charging port by a lid lock. When a refueling or charging is required, the lid lock has to be manually manipulated to open the lid, and then the vehicle is refueled or recharged via the fuel charging port or the electricity charging port. Moreover, when it is needed to close the lid after the refueling or charging is completed, the lid lock still has to be manually manipulated to close the lid. This manner requires manual unlocking of the lid lock to open the lid. Because the lid lock for the fuel charging port or the electricity charging port is disposed at the exterior of the vehicle body, an operator has to get out of the vehicle to get to the outside of the vehicle to lock/unlock the lid lock, which is extremely inconvenient.

SUMMARY OF EMBODIMENTS OF THE DISCLOSURE

To solve the above problems, a purpose of the present disclosure is to provide a fuel charging or electricity charging port lid lock, which enables automatic opening or closing of the fuel charging or electricity charging port lid without manual manipulation of the lid lock.

To achieve the above purpose, a first aspect of the present disclosure is to provide a fuel charging or electricity charging port lid lock, comprising: an elevating shaft being provided with an elevating thread on an exterior wall thereof; a worm gear configured to drive the elevating shaft, the worm gear being provided with an inner thread and an outer gear, the worm gear being sleeved outside of the elevating shaft, the inner thread of the worm gear being engaged with the elevating thread of the elevating shaft; and a worm configured to drive the worm gear, the worm being provided with helical teeth at an exterior thereof, the helical teeth being engaged with the outer gear of the worm gear; wherein the elevating shaft is configured to be capable of moving up and moving down along an axial direction of the elevating shaft and rotating about the axial direction of the elevating shaft when driven by the worm; and a head portion of the elevating shaft is used to drive a fuel charging or electricity charging port lid so as to control the opening and closing of the fuel charging or electricity charging port lid.

According to the first aspect, the fuel charging or electricity charging port lid is provided at the head portion of the elevating shaft, the fuel charging or electricity charging port lid following the movement of the elevating shaft to move up, move down and/or rotate.

According to the first aspect, the fuel charging or electricity charging port lid lock further comprises: a housing provided with a hole for the elevating shaft to pass through, the housing accommodating the elevating shaft, the head portion of the elevating shaft projecting out of the hole; wherein the housing is stationary relative to the up-and-down movement of the elevating shaft.

According to the first aspect, the housing is configured to accommodate the worm gear and limit an axial movement of the worm gear.

According to the first aspect, the housing further comprises a bush for accommodating the elevating shaft, the bush being provided with at least one positioning pin on an inner wall thereof; the elevating shaft is provided with a trajectory worm on a tail portion thereof, the trajectory worm being provided with at least one trajectory groove on an exterior surface thereof, each of the at least one trajectory groove including an upper straight groove extending along the axial direction of the elevating shaft and a lower threaded groove helically extending about the elevating shaft, the straight groove communicating with the threaded groove; and the positioning pin cooperates with the trajectory groove, for controlling a rotary trajectory of the elevating shaft when the elevating shaft moves up and down.

According to the first aspect, when the positioning pin is slidably fitted to the straight groove, the elevating shaft only performs an up movement or down movement; and when the positioning pin is slidably fitted to the threaded groove, the elevating shaft performs a rotary movement while moving up or moving down.

According to the first aspect, the axial direction of the worm is arranged to be perpendicular to the axial direction of the elevating shaft.

According to the first aspect, the fuel charging or electricity charging port lid lock further comprises: a motor provided with a driving shaft, the driving shaft being connected to the worm so as to drive the worm to rotate by the motor.

According to the first aspect, the fuel charging or electricity charging port lid lock further comprises: a fuel charging or electricity charging port lid mount seat, wherein the fuel charging or electricity charging port lid mount seat is connected to the head portion of the elevating shaft, and the fuel charging or electricity charging port lid is mounted at an upper side of the fuel charging or electricity charging port lid mount seat so as to mount the fuel charging or electricity charging port lid at the head portion of the elevating shaft.

According to the first aspect, the fuel charging or electricity charging port lid lock further comprises: a limiting stop connected to a top portion of the housing and configured to allow the elevating shaft to pass through.

According to the first aspect, the fuel charging or electricity charging port lid lock further comprises: a sensor configured detect whether the fuel charging or electricity charging port lid is in a closed state or in an open state, and to generate a state signal of the fuel charging or electricity charging port lid lock.

A second aspect of the present disclosure provides a fuel charging or electricity charging port lid assembly for a vehicle, comprising: a connection chassis provided with the fuel charging or electricity charging port; a fuel charging or electricity charging port lid configured to close or open the fuel charging or electricity charging port on the connection chassis; and the fuel charging or electricity charging port lid lock according to any item of the first aspect; wherein the fuel charging or electricity charging port lid is connected to the head portion of the elevating shaft of the fuel charging or electricity charging port lid lock, the connection chassis is stationary relative to the up-and-down movement of the elevating shaft, and the fuel charging or electricity charging port lid is engaged, at a closed position, with the connection chassis, so as to close the fuel charging or electricity charging port on the connection chassis.

According to the second aspect, the connection chassis and the fuel charging or electricity charging port lid are provided with magnets thereon, respectively, such that when the fuel charging or electricity charging port lid is at a closed position, the magnets on the connection chassis and the magnets on the fuel charging or electricity charging port lid are mutually attracted, causing the fuel charging or electricity charging port lid to be completely closed at the closed position.

According to the second aspect, the connection chassis is secured to a vehicle body of the vehicle.

According to the second aspect, the lid assembly for the fuel charging or electricity charging port is in communication connection with a central control system of the vehicle so as to control the opening and closing of the fuel charging or electricity charging port lid via the central control system of the vehicle.

The fuel charging or electricity charging port lid lock according to the present disclosure implements automatic opening or closing of the fuel charging or electricity charging port lid by: using the worm on the motor to drive the worm gear to rotate, causing the worm gear and the elevating shaft to rotate relatively to each other due to the mutual engagement between the inner thread of the worm gear and the elevating thread of the elevating shaft, which further drives the elevating shaft to move, and further causing the fuel charging or electricity charging port lid connected to the head portion of the elevating shaft to move with the elevating shaft. Meanwhile, the present disclosure saves the space needed for opening the lid by controlling the movement trajectory of the elevating shaft and the fuel charging or electricity charging port lid via the trajectory worm at the tail portion of the elevating shaft, causing the lid may be rotated to open.

DETAILED DESCRIPTION OF EMBODIMENTS

Hereinafter, various embodiments of the present disclosure will be described with reference to the accompanying drawings constituting part of the specification. It should be understood that although terms indicating directions, such as "front," "rear," "up," "down," "left," "right," are used in the present disclosure to describe various exemplary structural parts and elements of the present disclosure, these terms are only determined based on the exemplary orientations shown in the drawings for the convenience of illustration. Because the embodiments disclosed by the present disclosure may be set according to different directions, such terms indicating directions are only used for illustration, and not used for limiting. In possible circumstances, same or like reference numerals used in the present disclosure refer to the same parts.

Figure 1A:
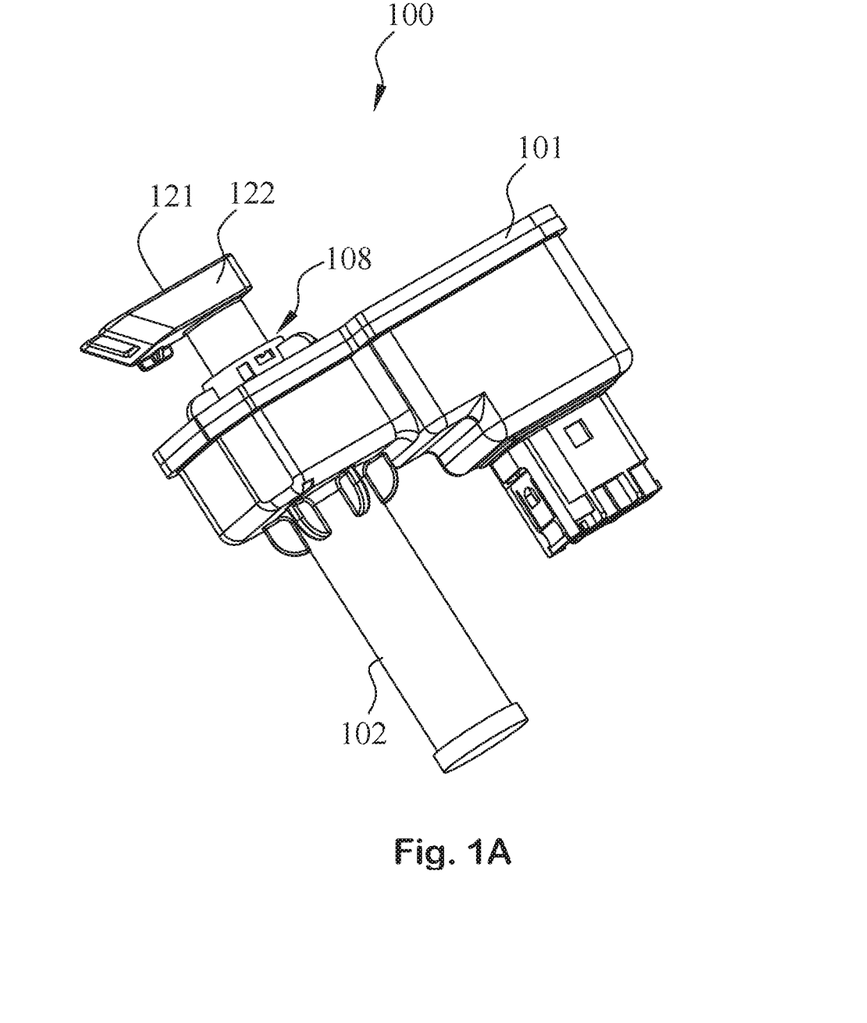
FIG. 1A is a structural schematic diagram of a fuel charging or electricity charging port lid lock according to the present disclosure.
Figure 1B:
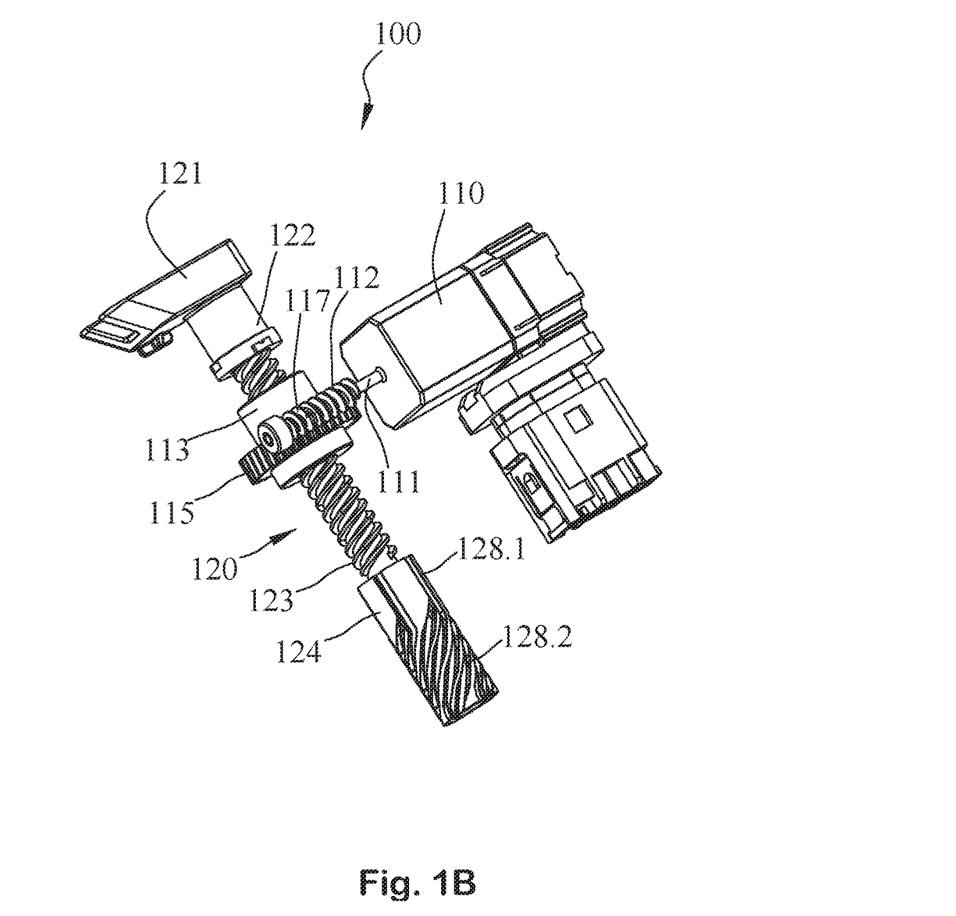
FIG. 1B is a structural schematic diagram of a fuel charging or electricity charging port lid lock shown in FIG. 1A after the housing is removed.
Figure 4A:
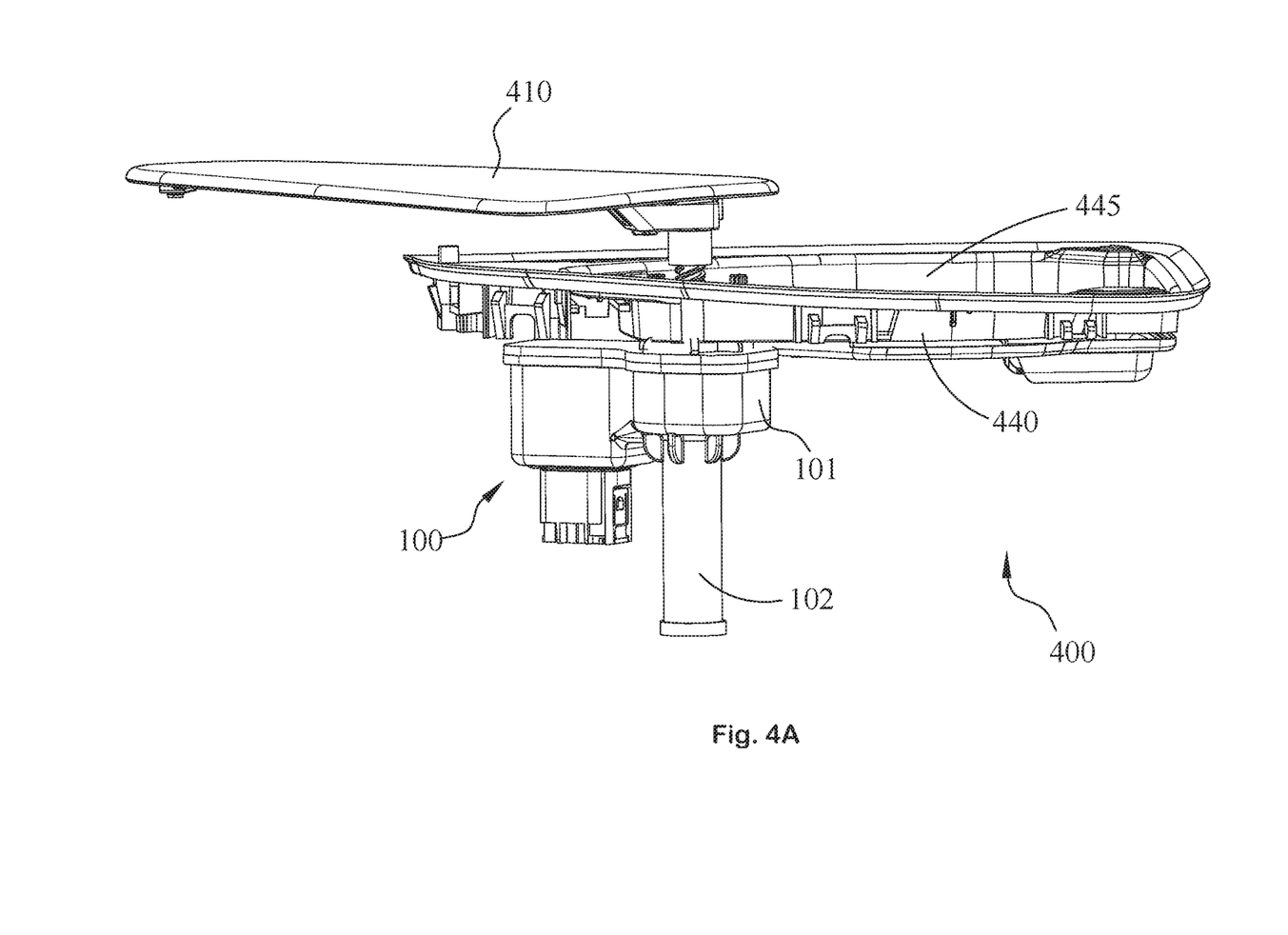
FIG. 4A is a structural schematic diagram of a fuel charging or electricity charging port lid assembly for a vehicle according to the present disclosure, wherein the fuel charging or electricity charging port lid is in a completely opened state.
Figure 4B:
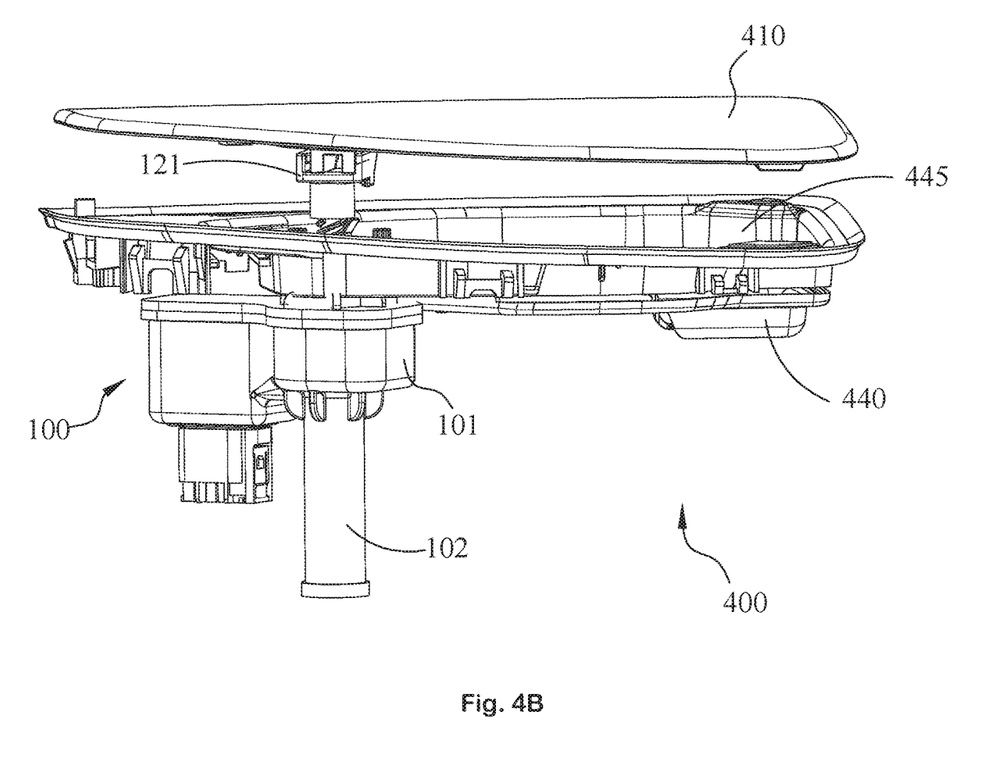
FIG. 4B is a structural schematic diagram of the fuel charging or electricity charging port lid assembly for a vehicle according to the present disclosure from another angle, wherein the fuel charging or electricity charging port lid is in a state between being completely opened and being completely closed.

FIG. 1A is a structural schematic diagram of a fuel charging or electricity charging port lid lock 100 according to the present disclosure. As shown in FIG. 1A, the lid lock 100 comprises a housing 101, the housing 101 being stationary relative to a vehicle body of a vehicle mounted with the fuel charging or electricity charging port lid lock 100 of the present disclosure. To illustrate the structure of the lid lock 100 inside the housing 101, FIG. 1B shows a structure of FIG. 1A after the housing 101 is removed. As shown in FIG. 1A and FIG. 1B, the lid lock 100 comprises a housing 101, an elevating shaft 120 disposed in the housing 101, a worm gear 113, and a worm 112. The housing 101 is provided with a hole 108 (see FIG. 2A) for the elevating shaft 120 to pass through, a head portion 230 of the elevating shaft 120 projecting out of the hole 108. The head portion 230 of the elevating shaft 120 is connected to a fuel charging or electricity charging port lid 410 (as shown in FIGS. 4A and 4B). Because the housing 101 is stationary relative to the up-and-down movement of the elevating shaft 120, the elevating shaft 120 may move up, move down and/or rotate relative to the housing 101, thus the fuel charging or electricity charging port lid 410 is driven to move up, move down and/or rotate by the elevating shaft 120, so as to expose the fuel charging or electricity charging port 443 of the vehicle covered by the fuel charging or electricity charging port lid 410.

Specifically, the fuel charging or electricity charging port lid 410 is connected to the elevating shaft 120 by a lid mount seat 121, the lid mount seat 121 including a sleeve 122, the sleeve 122 being sleeved on the head portion 230 of the elevating shaft 120 (see FIG. 2A), thereby the fuel charging or electricity charging port lid 410 being mounted at the head portion 230 of the elevating shaft 120. An exterior wall of the elevating shaft 120 is provided with an elevating thread 123, and the worm gear 113 is sleeved outside of the elevating shaft 120. A trajectory worm 124 for controlling a trajectory of the movement of the elevating shaft 120 is provided at a bottom portion of the elevating shaft 120.

Figure 2A:
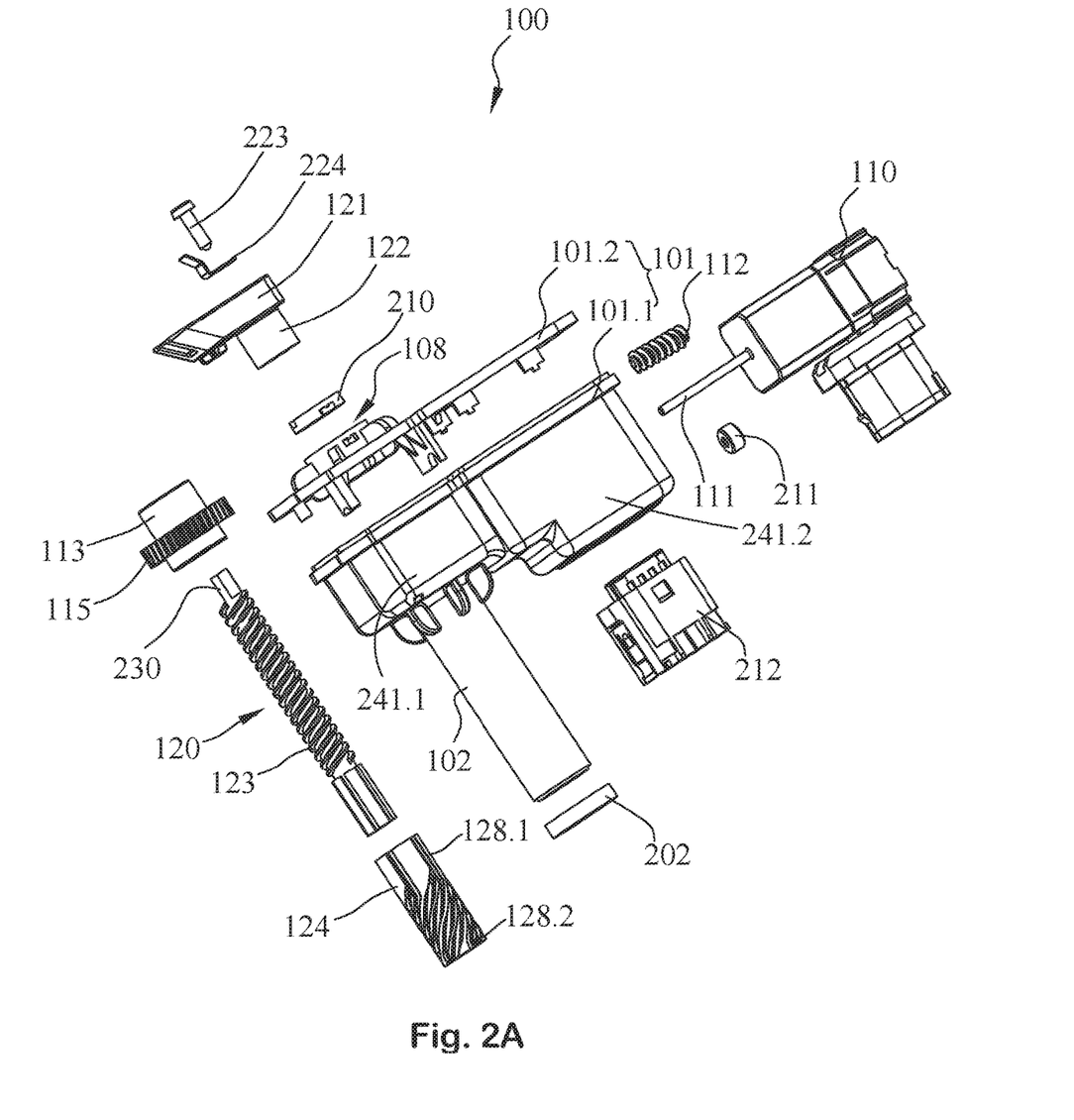
FIG. 2A is an exploded view of FIG. 1A, showing the structures of parts of the fuel charging or electricity charging port lid lock.
Figure 2B:
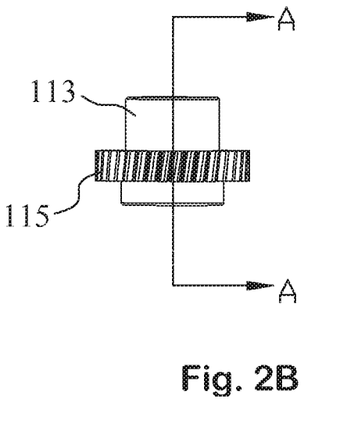
FIG. 2B is a structural schematic view of a worm gear in FIG. 2A.
Figure 2C:
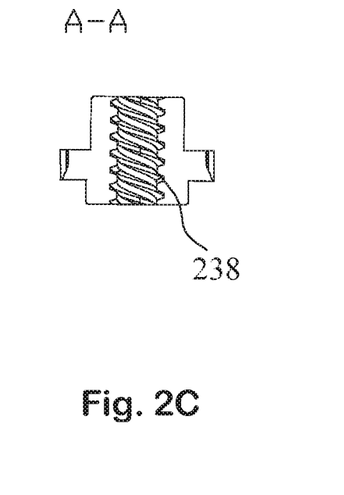
FIG. 2C is a sectional view taken along line A-A of FIG. 2B, showing the structure of an inner thread of a worm gear.

An inner thread 238 (as shown in FIG. 2C) is provided inside the worm gear 113, and an external gear 115 is provided at the exterior of the worm gear 113. Particularly, the inner thread 238 is engaged with the elevating thread 123 on the elevating shaft 120, such that the worm gear 113 and the elevating shaft 120 may rotate relatively, thereby driving the elevating shaft 120 to axially move up and move down. The specific structure of the worm gear 113 is shown in FIGS. 2B and 2C, where FIG. 2B shows an external gear 115 at the exterior of the worm gear 113, while FIG. 2C shows a sectional view taken along line A-A of FIG. 2B to illustrate the inner thread 238 engaged with the elevating thread 123 inside the worm gear 113.

Referring back to FIGS. 1A and 1B, the worm 112 is connected to a driving shaft 111 of a motor 110, such that the motor 110 may drive the worm 112 to rotate. The motor 110 is in communication connection with a central control system of the vehicle, such that the switch-on/switch-off of the motor 110 may be controlled by the central control system of the vehicle. Helical teeth 117 is provided at the exterior of the worm 112, and the helical teeth 117 is engaged with the external gear 115 of the worm gear 113, such that the rotation of the worm 112 drives the worm gear 113 to rotate. The rotation of the worm gear 113 may drive the elevating shaft 120 to axially move up or move down. According to an example of the present disclosure, the axial direction of the worm 112 is perpendicular to the axial direction of the elevating shaft 120, such that the rotation of the worm 112 about its axial direction drives the elevating shaft 120 to axially move up or move down.

FIG. 2A is an exploded view of the fuel charging or electricity charging port lid lock 100 of FIG. 1A, further showing specific structures of respective parts in the fuel charging or electricity charging port lid lock 100 of the present disclosure. As shown in FIG. 2A, the housing 101 comprises a housing cap 101.2 and a housing base 101.1. According to one example of the present disclosure, the housing cap 101.2 and the housing base 101.1 are connected by welding. However, other manners may also be employed to connect the housing cap 101.2 and the housing base 101.1, all of which are within the protection scope of the present disclosure. The hole 108 that allows the head portion 230 of the elevating shaft 120 to project out of the housing 101 is provided in the cap 101.2. A bush 102 is provided on the housing base 101.1, for accommodating the elevating shaft 120. A bottom portion of the bush 102 is connected to a bottom support 202 for sealing the bottom portion of the bush 102.

At least one positioning pin 231 (see FIG. 2E) is provided on an inner wall of the bush 102. At least one trajectory groove 128 is provided on an exterior surface of the trajectory worm 124; and the at least one positioning pin 231 may project into the at least one trajectory groove 128, so as to control a motion trajectory of the elevating shaft 120 through a cooperative work between the positioning pin 231 and the trajectory groove 128, such that the elevating shaft 120 may rotate or may not rotate while moving up or moving down. According to an example of the present disclosure, the trajectory groove 128 may be provided in plurality. The plurality of trajectory grooves 128 are evenly distributed surrounding the trajectory worm 124. The number and positions of the positioning pins 231 are arranged to match those of the plurality of trajectory grooves 128.

Specifically, each trajectory groove 128 on the trajectory worm 124 includes an upper straight groove 128.1 and a lower threaded groove 128.2, and the straight groove 128.1 communicates with the threaded groove 128.2. The straight groove 128.1 extends along an axial direction of the elevating shaft 120, the threaded groove 128.2 extends helically about the elevating shaft 120, and a helical direction of the threaded groove 128.2 is identical to the helical direction of the elevating thread 123 on the elevating shaft 120. When the positioning pin 231 works in cooperation with the straight groove 128.1 on the exterior surface of the trajectory worm 124, the straight groove 128.1 provides a torsion reverse to the rotary direction of the elevating shaft 120, such that the rotary movement of the worm gear 113 only drives the elevating shaft 120 to move up and move down, without driving the elevating shaft 120 to rotate. After the positioning pin 231 enters the threaded groove 128.2 on the exterior surface of the trajectory worm 124, the rotary movement of the worm gear 113 not only may drive the elevating shaft 120 to move up and move down, but also may drive the elevating shaft 120 to rotate.

The trajectory worm 124 may be sleeved at the bottom portion of the elevating shaft 120 or may be integrally formed with the elevating shaft 120. According to an example of the present disclosure, to facilitate machining of the trajectory groove 128, the trajectory worm 124 may be machined separately and then is sleeved at the bottom portion of the elevating shaft 120.

Figure 2D:
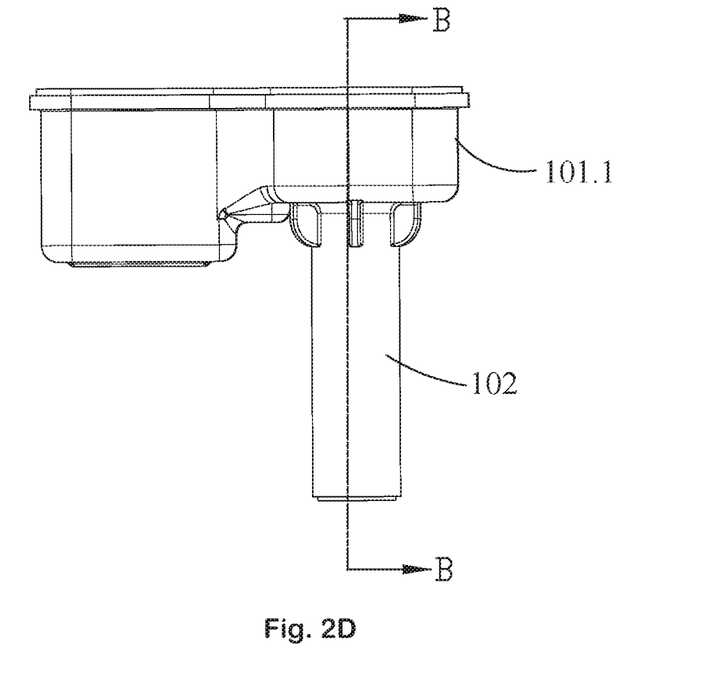
FIG. 2D is a structural schematic view of a housing base in FIG. 2A.
Figure 2E:
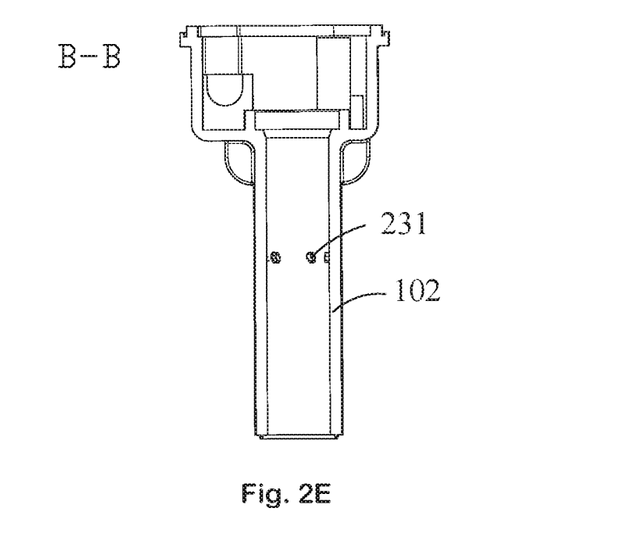
FIG. 2E is a sectional view taken along line B-B of FIG. 2D, showing a positioning pin on a inner wall of a bush of a housing base.

The structure of the bush 102 is specifically shown in FIG. 2D and FIG. 2E. As illustrated in FIG. 2D, the bush 102 is provided at a lower portion of the housing base 101.1. FIG. 2E is a sectional view of the housing base 101.1 taken along line B-B in FIG. 2D. As shown in FIG. 2E, the positioning pin 231 is provided on the inner wall of the bush 102.

By adopting the above worm gear-worm mechanism and the worm gear structure sleeved on the elevating shaft, the fuel charging or electricity charging port lid lock of the present disclosure not only allows the elevating shaft to move up and move down, but also may control the elevating shaft to rotate or not to rotate while moving up and moving down. In this way, the fuel charging or electricity charging port lid lock of the present disclosure not only may lift or lower the fuel charging or electricity charging port lid, but also may cause the fuel charging or electricity charging port lid to rotate, thereby capable of exposing the fuel charging or electricity charging port covered by the fuel charging or electricity charging port lid.

Referring back to FIG. 2A, a first cavity 241.1 and a second cavity 241.2, which are in communication, are provided in the housing base 101.1, wherein the first cavity 241.1 is disposed at an upper portion of the bush 102 and is in communication with the bush 102. The first cavity 241.1 is configured to accommodate the worm gear 113; and when the housing cap 101.2 covers the housing base 101.1, the movement of the worm gear 113 in the axial direction is restricted by the housing cap 101.2 and the housing base 101.1, such that the worm gear 113, when engaged with the elevating shaft 120, only performs a rotary movement. The second cavity 241.2 is arranged for bearing the motor 110.

Still referring to FIG. 2A, a top portion of the housing cap 101.2 is connected with a limiting stop 210, the limiting stop 210, for example, being connected to the top portion of the housing cap 101.2 through the snap-fitting. The limiting stop 210 has a ring shape, and the elevating shaft 120 passes through the limiting stop 210. The limiting stop 210 may be fitted with a bottom portion of the lid mount seat 121 that connects the fuel charging or electricity charging port lid 410 to the head portion 230 of the elevating shaft 120, so as to prevent the elevating shaft 120 from its continuing downward movement when the elevating shaft 120 moves downwardly to a closed position of the fuel charging or electricity charging port lid. Besides, an annular inner diameter of the limiting stop 210 is set to be substantially equal to or slightly larger than the outer diameter of the threaded teeth portion of the elevating shaft 120. In this way, the upper portion of the elevating shaft 120 is limited by the limiting stop 210, and the lower portion of the elevating shaft 120 is limited by a portion of the bush 102 where the positioning pin 321 is mounted. Therefore, the limiting stop 210 cooperates with the portion of the bush 102 where the positioning pin 321 is mounted, such that the elevating shaft 120 may steadily move up, move down and/or rotate. Because the limiting stop 210 is an individual part, when using the limiting stop 210 instead of the housing cap 101.2 as the limiter for the upper portion of the elevating shaft 120, the requirements for the assembly accuracy of the housing cap and the base may be lowered, and a worn limiting stop 210 may be changed more easily.

FIG. 2A further shows a limiting nut 211, a fastening bolt 223 and a fastening spring plate 224. Particularly, the limiting nut 211 is sleeved on the driving shaft 111 of the motor, for limiting the position of the worm 112 on the driving shaft 111. The fastening bolt 223 and the fastening spring plate 224 are disposed on the mount seat 121, for connecting the elevating shaft 120 and the mount seat 121.

After the various parts shown in FIG. 2A are assembled together, most parts of the lid lock are accommodated in the housing, thereby forming a modular door lock structure shown in FIG. 1A. By forming the fuel charging or electricity charging port lid lock of the present disclosure into a modular structure, when in use, the fuel charging or electricity charging port lid lock of the present disclosure may be conveniently mounted, and conveniently dismounted for maintenance. Besides, the modular structure enables the fuel charging or electricity charging port lid lock of the present disclosure to be adapted to existing structures of the vehicle body, thereby improving the adaptability of the fuel charging or electricity charging port lid lock of the present disclosure.

Figure 3A:
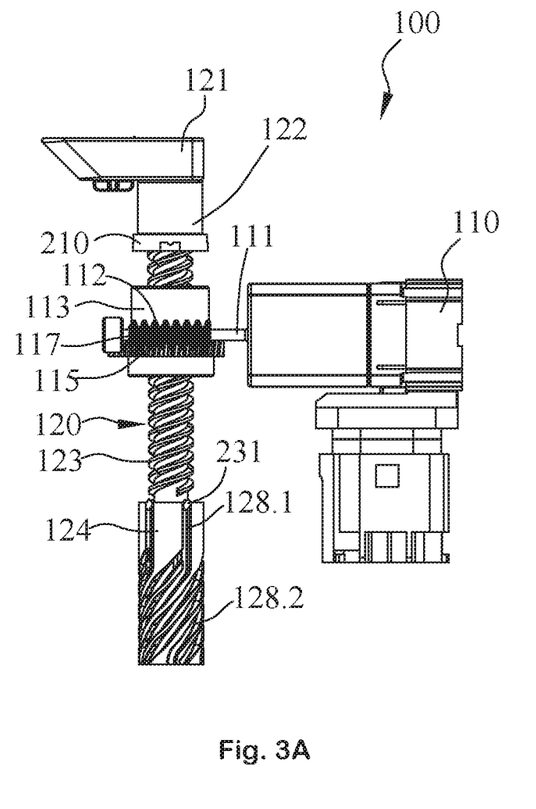
FIG. 3A is a structural schematic diagram of a fuel charging or electricity charging port lid lock according to the present disclosure when the fuel charging or electricity charging port lid is completely closed.
Figure 3B:
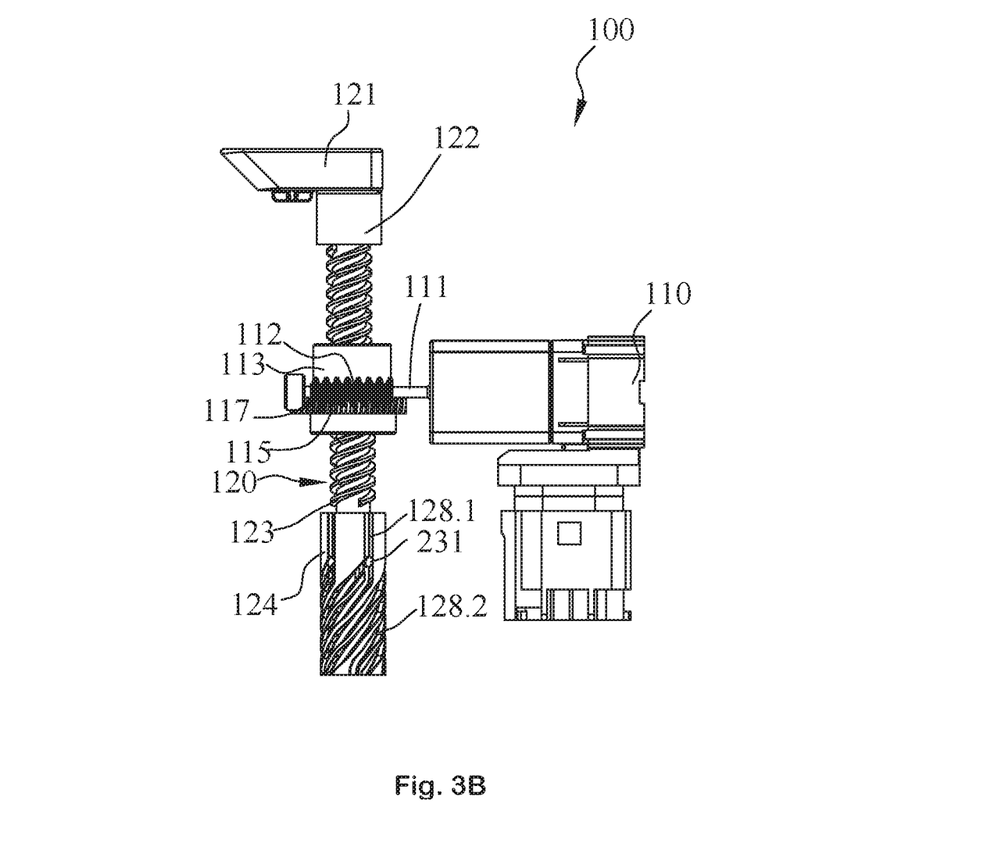
FIG. 3B is a structural schematic diagram of a fuel charging or electricity charging port lid lock according to the present disclosure during the process of opening or closing the fuel charging or electricity charging port lid.
Figure 3C:
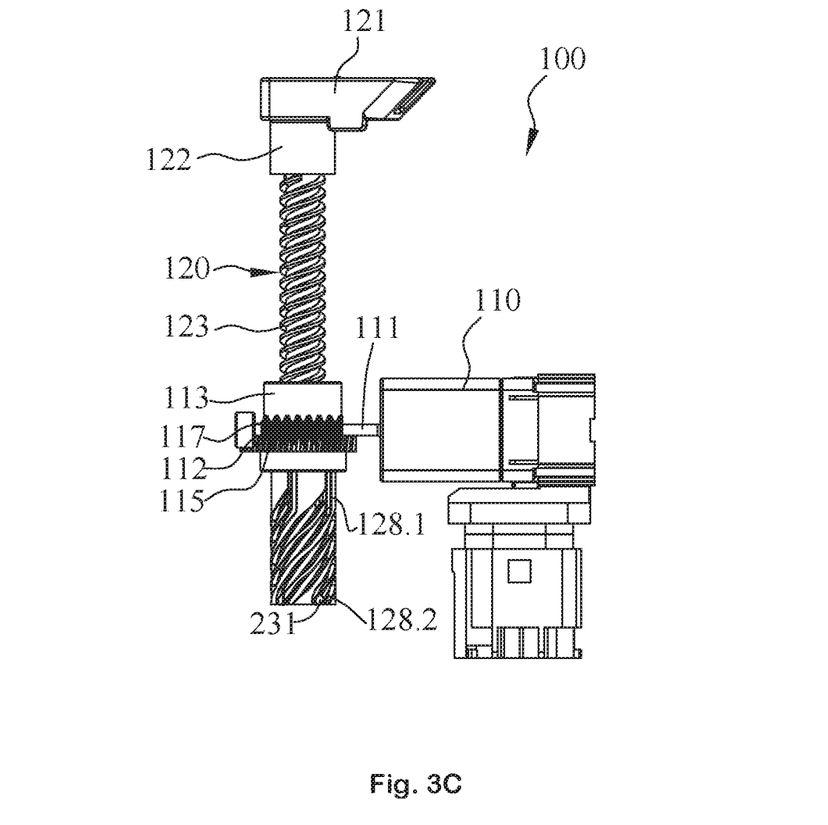
FIG. 3C is a structural schematic diagram of a fuel charging or electricity charging port lid lock according to the present disclosure when the fuel charging or electricity charging port lid is completely opened.

FIGS. 3A, 3B, and 3C show the cooperation relationships between respective parts in the lid lock 100 of the present disclosure when the elevating shaft 120 is driving the fuel charging or electricity charging port lid 410 to move, for illustrating the specific process of how the trajectory worm 124 limits a motion trajectory, wherein the housing 101 of the lid lock is omitted to facilitate the illustration. Specifically, the drawings from FIG. 3A, through FIG. 3B, to FIG. 3C sequentially indicate a state of the fuel charging or electricity charging port lid 410 from being closed to being open; and on the contrary, the drawings from FIG. 3C, through FIG. 3B, to FIG. 3A sequentially indicates a state of the fuel charging or electricity charging port lid 410 from being open to being closed.

To indicate the cooperation relationship between the positioning pin 231 and the trajectory groove 128, the bush 102 is omitted in FIGS. 3A~3C, but the positioning pin 231 on the inner wall of the bush 102 is illustrated. Those skilled in the art should understand that the positioning pin 231 is still disposed on the inner wall of the bush 102.

As shown in FIG. 3A, when the fuel charging or electricity charging port lid 410 is in a closed state, the trajectory worm 124 is disposed at a bottommost portion of the bush 102, and the positioning pin 231 is disposed at the top portion of the straight groove 128.1. When the motor 110 is controlled to perform an operation of opening the fuel charging or electricity charging port lid 410, the driving shaft 111 of the motor 110 drives the worm 112 to rotate, thereby driving the worm gear 113 to rotate; the worm gear 113 then drives the elevating shaft 120 to move up along the axial direction of the elevating shaft 120. Because the positioning pin 231 is disposed on the inner wall of the bush 102 of the housing 101 while the housing 101 is stationary relative to the elevating shaft 120, the cooperation between the positioning pin 231 and the straight groove 128.1 limits the rotary movement of the elevating shaft 120, such that the elevating shaft 120 may only perform a straight up movement, and cannot perform a rotary movement, till the positioning pin 231 reaches the bottommost portion of the straight groove 128.1 (as shown in FIG. 3B). From the position in FIG. 3A to FIG. 3B, the lid 410 to which the head portion 230 of the elevating shaft 120 is connected projects upward for a certain distance.

As shown in FIG. 3B, at this point, the positioning pin 231 is disposed at the bottommost portion of the straight groove 128.1; when the motor 110 is controlled to continuously cause the worm 112 to rotate, the rotation of the worm gear 113 then drives the elevating shaft 120 to continually move up along the axial direction of the elevating shaft 120, such that the positioning pin 231 enters the threaded groove 128.2 from the straight groove 128.1. When the positioning pin 231 enters the threaded groove 128.2, the elevating shaft 120 may also perform a rotary movement while moving up, till the positioning pin 231 reaches the bottommost portion of the threaded groove 128.2 (as shown in FIG. 3C). Because the elevating shaft 120 performs a rotary movement, the lid 410 to which the elevating shaft 120 is connected is also rotated, such that the fuel charging or electricity charging port may be exposed (which will be described in detail infra).

As shown in FIG. 3C, the positioning pin 321 reaches the bottommost portion of the threaded groove 128.2, causing the elevating shaft 120 to stop moving. At this point, the motor 110 stops the rotation of the driving shaft 111, and the fuel charging or electricity charging port lid 410 is completely opened.

An operation of closing the fuel charging or electricity charging port lid 410 becomes reverse to the procedure described above, where starting from the initial state of the lid lock 100 shown in FIG. 3C, the elevating shaft 120 moves down and performs a rotary movement, and then moves down in a straight line till the lid lock 100 is completely closed. Moreover, by the cooperation between the limiting stop 210 connected on the elevating shaft 120 and the sleeve 122 at the bottom portion of the lid mount seat 121, the lid 410 is stopped at the closed position without moving down continuously relative to the bush 102.

The lid lock 100 of the present disclosure may further comprise a sensor (not shown). The sensor may be connected to the motor 110 to sense whether a position of the lid 410 is in a closed state or an open state, and generates a state signal of the fuel charging or electricity charging port lid lock 100. According to an example of the present disclosure, the sensor computes whether the position of the lid 410 is in a closed state or in an open state by recording the number of rotating turns of the driving shaft 111 of the motor 110. The lid lock 100 of the present disclosure further comprises a connector 212 for electrically connecting the motor 110 to a vehicle central control system, and through the central control system, a control signal of closing or opening the fuel charging or electricity charging port lid lock 100 may be transmitted to the motor 110, or the signal transmitted by the motor 110 may be received (e.g., a state signal of the fuel charging or electricity charging port lid lock 100).

By applying the fuel charging or electricity charging port lid lock of the present disclosure in a vehicle, the opening and closing of the fuel charging or electricity charging port lid may be automatically controlled via the central control system of the vehicle. Moreover, the fuel charging or electricity charging port lid lock of the present disclosure may not only implement the automatic opening of the fuel charging or electricity charging port lid, but also may implement the automatic closing of the fuel charging or electricity charging port lid, such that regardless of the requirement to perform an opening operation or a closing operation on the fuel charging or electricity charging port lid, the manual operation of the fuel charging or electricity charging port lid is not needed. Therefore, the opening or closing of the fuel charging or electricity charging port lid of the vehicle may be controlled without requiring the driver to get off the vehicle. Additionally, by providing a sensor, the driver may know whether the fuel charging or electricity charging port lid of the vehicle is in an open state or in a closed state without getting off the vehicle, and may predetermine whether the fuel charging or electricity charging port lid is open when starting the vehicle, thereby avoiding the accidental opening of the fuel charging or electricity charging port lid.

FIG. 4A is a structural schematic diagram of a fuel charging or electricity charging port lid assembly for a vehicle according to the present disclosure, wherein the fuel charging or electricity charging port lid is in a completely open state; FIG. 4B is an another structural schematic diagram of the fuel charging or electricity charging port lid assembly for a vehicle according to the present disclosure, wherein the fuel charging or electricity charging port lid is in a state between being completely open and being completely closed.

Figure 6:
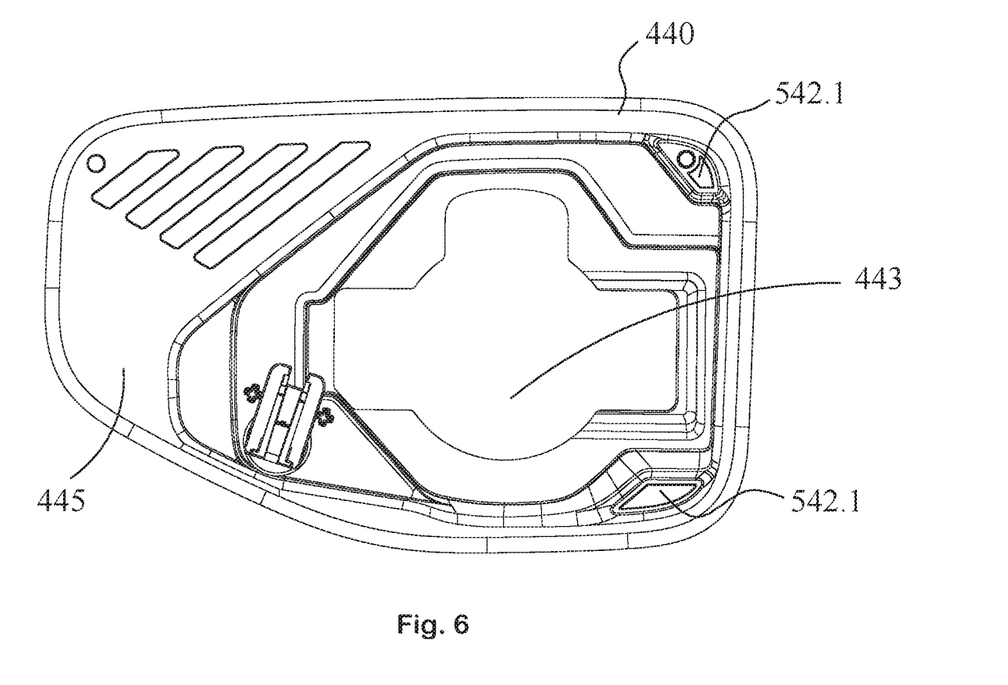
FIG. 6 is a view of a top portion of a connection chassis in FIG. 4A, showing the magnets.

As shown in FIG. 4A, a fuel charging or electricity charging port lid assembly 400 for a vehicle comprises a fuel charging or electricity charging port lid 410, a connection chassis 440, and a fuel charging or electricity charging port lid lock 100. The connection chassis 440 has a fuel charging or electricity charging port 443 (as shown in FIG. 6) and is connected to a vehicle body. The fuel charging or electricity charging port lid 410 is connected to the head portion 230 of the elevating shaft 120 of the fuel charging or electricity charging port lid lock 100 as described above. The housing 101 of the fuel charging or electricity charging port lid lock 100 is connected to the connection chassis 440, such that the housing 101 of the lid lock 100 is also secured to the vehicle body. The elevating shaft 120 passes through the connection chassis 440, and with the moving up, moving down and/or rotating of the elevating shaft 120, the lid 410 connected to the head portion 230 of the elevating shaft 120 also moves up, moves down and/or rotates. The connection chassis 440 has an opening 445. A shape of the opening 445 is matched to a shape of the lid 410, such that when the lid 410 is in the closed position, the lid 410 may close the opening 445 of the connection chassis 440.

As shown in FIG. 4A, at this point, the fuel charging or electricity charging port lid 410 is in a completely open state. As shown in FIG. 4B, at this point, the fuel charging or electricity charging port lid 410 is in a state between being completely open and being completely closed, where the positioning pin 231 just arrives at the bottommost portion of the straight groove 128.1, but has not entered the threaded groove 128.2 yet. It may be seen that, from the completely closed position to the completely open position, the fuel charging or electricity charging port lid 410 rotates a certain angle such that the fuel charging or electricity charging port covered by the fuel charging or electricity charging port lid 410 may be exposed.

Figure 5:
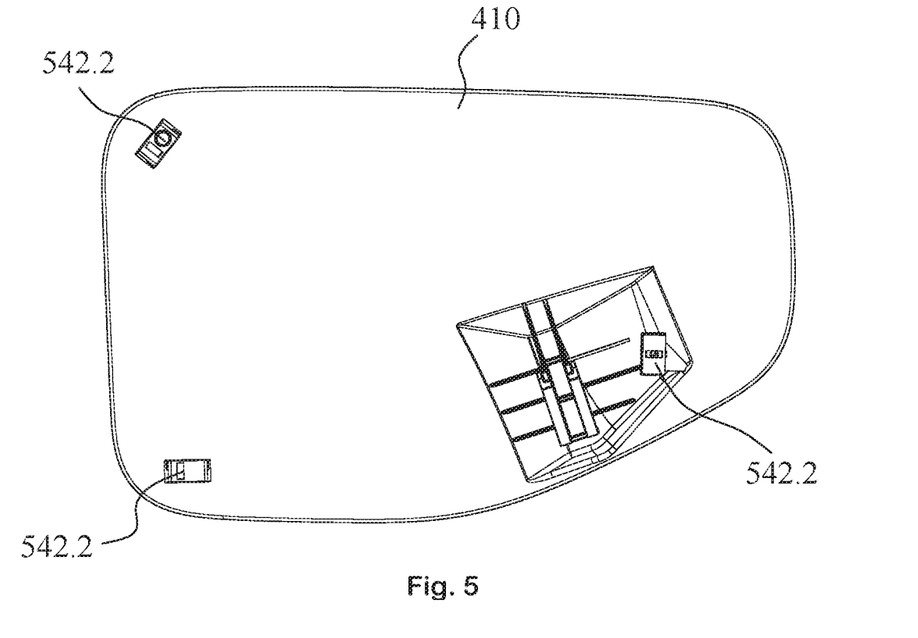
FIG. 5 is a view of a bottom portion of the fuel charging or electricity charging port lid in FIG. 4A, showing the magnets.

FIG. 5 is a view of a bottom portion of the fuel charging or electricity charging port lid in FIG. 4A; and FIG. 6 is a view of a top portion of a connection chassis in FIG. 4A, these two drawings respectively showing the magnets provided on the fuel charging or electricity charging port lid and the connection chassis.

As shown in FIG. 5, magnets 542.1, 542.2, and 542.3 are provided on the bottom portion of the lid 410. As shown in FIG. 6, magnets 542.1 and 542.2 are also provided on the top portion of the connection chassis 440. When the lid 410 is in a closed state, the magnets 542.1 and 542.2 on the lid 410 and the magnets 542.1 and 542.2 on the connection chassis 440 are mutually attracted, causing the lid 410 to be completely closed at the closed position. In this way, the lid 410 may remain flush with the vehicle body, guaranteeing the aesthetics of the vehicle body. One or more magnets may be provided according to needs, which may be arranged along an edge of the lid 410, so as to better guarantee the smoothness between the lid and the vehicle body.

Although the present disclosure has been described above with reference to the preferred embodiments shown in the drawings, it should be understood that the fuel charging or electricity charging port lid lock of the present disclosure may have many variations without departing from the spirit, the scope, and the background taught by the present disclosure. A person of ordinary skill in the art may also be aware that the alterations to the structures in the embodiments of the present disclosure in various manners all fall into the spirit and scope of the present disclosure and the appended claims.

What is claimed is:

1. A fuel charging or electricity charging port lid lock, comprising:
    an elevating shaft being provided with an elevating thread on an exterior wall thereof;
    a worm gear configured to drive the elevating shaft, the worm gear being provided with an inner thread and an outer gear, the worm gear being sleeved outside of the elevating shaft, and the inner thread of the worm gear being engaged with the elevating thread of the elevating shaft; and
    a worm configured to drive the worm gear, the worm being provided with helical teeth at an exterior thereof, and the helical teeth being engaged with the outer gear of the worm gear;
    wherein the elevating shaft is configured to be capable of moving up and moving down along an axial direction of the elevating shaft and rotating about the axial direction of the elevating shaft when driven by the worm; and wherein a head portion of the elevating shaft is used to drive a fuel charging or electricity charging port lid so as to control the opening and closing of the fuel charging or electricity charging port lid.

2. The fuel charging or electricity charging port lid lock according to claim 1, wherein:
the fuel charging or electricity charging port lid is provided at the head portion of the elevating shaft and moves with the elevating shaft.

3. The fuel charging or electricity charging port lid lock according to claim 1, further comprising:
a housing provided with a hole for the elevating shaft to pass through, the housing accommodating the elevating shaft, and the head portion of the elevating shaft projecting out of the hole;
wherein the housing is stationary such that the elevating shaft moves relative to the housing when the elevating shaft moves up or down.

4. The fuel charging or electricity charging port lid lock according to claim 3, wherein:
the housing is configured to accommodate the worm gear and limit an axial movement of the worm gear.

5. The fuel charging or electricity charging port lid lock according to claim 3, wherein:
the housing further comprises a bush for accommodating the elevating shaft, the bush being provided with at least one positioning pin on an inner wall thereof;
the elevating shaft is provided with a trajectory worm on a tail portion thereof, the trajectory worm being provided with at least one trajectory groove on an exterior surface thereof, each of the at least one trajectory groove including an upper straight groove extending along the axial direction of the elevating shaft and a lower threaded groove helically extending about the elevating shaft, and the straight groove communicating with the threaded groove; and
the positioning pin configured to cooperate with the trajectory groove for controlling a rotary trajectory of the elevating shaft when the elevating shaft moves up and down.

6. The fuel charging or electricity charging port lid lock according to claim 5, wherein:
the elevating shaft is configured to only perform an up movement or down movement when the positioning pin is slidably fitted to the straight groove; and
the elevating shaft is configured to perform a rotary movement while moving up or moving down when the positioning pin is slidably fitted to the threaded groove.

7. The fuel charging or electricity charging port lid lock according to claim 5,
wherein the trajectory worm may be integrally formed with the elevating shaft or sleeved at the bottom portion of the elevating shaft.

8. The fuel charging or electricity charging port lid lock according to claim 3, further comprising:
a limiting stop connected to a top portion of the housing and configured to allow the elevating shaft to pass through.

9. The fuel charging or electricity charging port lid lock according to claim 8, wherein:
the limiting stop receives a bottom portion of a lid mount seat connecting the head portion of the elevating shaft with the fuel charging or electricity charging port lid, and prevents the elevating shaft from its continuing downward movement as the elevating shaft moves downwardly to a closed position of the fuel charging or electricity charging port lid.

10. The fuel charging or electricity charging port lid lock according to claim 1, wherein:
the worm is arranged such that the axial direction thereof is perpendicular to the axial direction of the elevating shaft.

11. The fuel charging or electricity charging port lid lock according to claim 1, further comprising:
a motor provided with a driving shaft, the driving shaft being connected to the worm so as to drive the worm to rotate by the motor.

12. The fuel charging or electricity charging port lid lock according to claim 11 further comprising:
a sensor connected to the motor,
wherein the sensor detects whether the fuel charging or electricity charging port lid is in a closed state or in an open state, and generates a signal state of the fuel charging or electricity charging port lid lock.

13. The fuel charging or electricity charging port lid lock according to claim 12 further comprising:
a connector to allow communication of a signal, including a control signal and a state signal, between the motor and a central control system of a vehicle.

14. The fuel charging or electricity charging port lid lock according to claim 11 further comprising:
a nut sleeved on the driving shaft of the motor for limiting the position of the worm on the drive shaft.

15. A fuel charging or electricity charging port lid assembly for a vehicle, comprising:
a connection chassis provided with a fuel charging or electricity charging port;
a fuel charging or electricity charging port lid configured to close or open the fuel charging or electricity charging port on the connection chassis; and
the fuel charging or electricity charging port lid lock according to claim 1;
wherein the fuel charging or electricity charging port lid is connected to the head portion of the elevating shaft of the fuel charging or electricity charging port lid lock, the connection chassis is stationary relative to the up-and-down movement of the elevating shaft, and the fuel charging or electricity charging port lid is engaged, at a closed position, with the connection chassis, so as to close the fuel charging or electricity charging port on the connection chassis.

16. The fuel charging or electricity charging port lid assembly according to claim 15, wherein:
the connection chassis and the fuel charging or electricity charging port lid are provided with magnets thereon such that when the fuel charging or electricity charging port lid is at a closed position, the magnets on the connection chassis and the magnets on the fuel charging or electricity charging port lid are mutually attracted, causing the fuel charging or electricity charging port lid to be completely closed at the closed position.

17. The fuel charging or electricity charging port lid assembly according to claim 15, wherein the connection chassis is secured to a vehicle body of the vehicle.

18. The fuel charging or electricity charging port lid assembly according to claim 15, wherein the fuel charging or electricity charging port is in communication with a central control system of the vehicle and the opening and closing of the fuel charging or electricity charging port is controlled by the central control unit of the vehicle.

19. The fuel charging or electricity charging port lid assembly according to claim 15, wherein:

the fuel charging or electricity charging port lid lock is connected to the connection chassis.

20. The fuel charging or electricity charging port lid lock according to claim 1 further comprising:
   a lid mount seat connected to the head portion of the elevating shaft and mounted at an upper side of the fuel charging or electricity charging port lid mount seat so as to mount the fuel charging or electricity charging port lid at the head portion of the elevating shaft.

* * * * *